(12) United States Patent
Hauptmann et al.

(10) Patent No.: US 7,021,872 B2
(45) Date of Patent: Apr. 4, 2006

(54) ROCK DRILL

(75) Inventors: Udo Hauptmann, Landsberg/Lech (DE); Tim Pröls, Munich (DE); Thorsten Assel, Landsberg/Lech (DE)

(73) Assignee: Hilti Aktiengesellschaft, Schaan (LI)

( * ) Notice: Subject to any disclaimer, the term of this patent is extended or adjusted under 35 U.S.C. 154(b) by 598 days.

(21) Appl. No.: 10/298,750

(22) Filed: Nov. 18, 2002

(65) Prior Publication Data

US 2003/0103823 A1  Jun. 5, 2003

(30) Foreign Application Priority Data

Nov. 30, 2001  (DE) ................................. 101 59 014

(51) Int. Cl.
 *B23B 51/02* (2006.01)
(52) U.S. Cl. .......................................... 408/16; 408/226
(58) Field of Classification Search .................. 408/16, 408/226, 227, 230; 175/39
See application file for complete search history.

(56) References Cited

U.S. PATENT DOCUMENTS

| 4,904,130 A | 2/1990 | Gorman |
| 5,303,574 A | 4/1994 | Mattossian |
| 6,250,295 B1 * | 6/2001 | Chanton et al. ............... 125/15 |
| 2001/0023783 A1 | 9/2001 | Obermeier |
| 2004/0129125 A1 * | 7/2004 | Colquhoun .................. 83/835 |

FOREIGN PATENT DOCUMENTS

| DE | 1965131 | * | 7/1971 |
| DE | 3613264 | * | 1/1996 |
| DE | 4424203 | * | 1/1996 |
| DE | 19810511 | * | 9/1999 |
| DE | 19859624 | * | 6/2000 |

OTHER PUBLICATIONS

Rough translation of German 19859624 from Babelfish. altavista website, three pages.*
Abstract of Soviet 905417, published Feb. 15, 1982.*

* cited by examiner

*Primary Examiner*—Daniel W. Howell
(74) *Attorney, Agent, or Firm*—Abelman, Frayne & Schwab

(57) ABSTRACT

A rock drill (1) for cutting rock comprising an elongated, helical shaft (2), which has, at one end, an insertion part (3) and, at the end opposite, a tool head (4) with cutters (5) made of hard material, wherein the helical shaft (2) is at least partially coated with a colored layer (7*a*, 7*b*) and the layer forms a lengthwise running wear indicator marking (8) inside the helical groove (8).

3 Claims, 1 Drawing Sheet

ROCK DRILL

BACKGROUND OF THE INVENTION

The invention relates to an at least partially rotational and percussively driven rock drill for cutting away rock-substance such as concrete and masonry.

Rock drills of this type comprise an extended, helical shaft that has, at one end, an insertion end for receiving a driving tool device and, at the opposite end, a tool head with cutting edges made of hard material. In a rock drill with auxiliary cutting edges there are frequently radially smaller auxiliary helices arranged between the main helices associated with the main cutting edges.

The tool head and the helices wear radially due to the direct wear from contact with the sides of the bore hole when cutting hard stone. The radial wear is a measure of the service life of the rock drill.

DE1965131A1 discloses a rock drill that has circumferential ridges or axis-parallel grooves of a particular depth on the helical spines that serve as wear indicators for wear resulting from direct contact with the sides of the bore hole. DE19859624 discloses a rock drill, wherein wear indicators are filled with color, in the spine of the helix, to visibly display sufficient remaining depth of the wear indicator. The low tolerable radial wear makes determination of wear difficult.

U.S. Pat. No. 4,904,130 discloses a rock drill, wherein a color coating in the floor of the groove acts as an indicator marking for drilling depth, which is subject to groove wear by the material cuttings.

SUMMARY OF THE INVENTION

The object of the invention is to provide a simple realization of a sensitive wear indicator marking having long service life for rock drills with auxiliary helices.

In accordance with the invention, an at least partially rotationally and percussively driven rock drill comprises an elongated, helical shaft for cutting away rock, said shaft comprising, at one, an insertion end and, on the opposite end, a tool head with cutters comprising hard material, wherein the helical shaft is coated at least partially with a colored layer and the colored shaft forms a wear marker running lengthwise within the helical groove.

The colored layer inside the helical groove is exposed to the abrasive wear by the cut material, as is the overall helical groove. The colored layer, however, is not exposed to the wear associated with direct contact with the sides of the bore hole, as such it has a long service life and is very sensitive due to the long helical groove.

Preferably, a colored layer is applied to the spines of radially smaller auxiliary helices arranged between the main helices, whereby movement of the cut material is not impaired by the uncoated floor of the grooves. The easily visible colored layer that is structurally offset is not subjected to the wear caused by direct contact with the sides of the bore hole since the auxiliary helix spines, including the colored layer, do not reach the envelope formed by the main helix spines.

Preferably, a plurality of different auxiliary helix spines are coated with different colored, different wearing layers, whereby sensitivity is further increased.

Preferably, the wear indicator marking is configured to run striplike lengthwise, such that the wear can constantly be read using the missing length of the wear marking.

BRIEF DESCRIPTION OF THE DRAWINGS

The invention will be more completely described with reference to the advantageous exemplary embodiment of the rock drill shown in FIG. 1, in accordance with the invention.

DETAILED DESCRIPTION OF THE INVENTION

Figure 1:
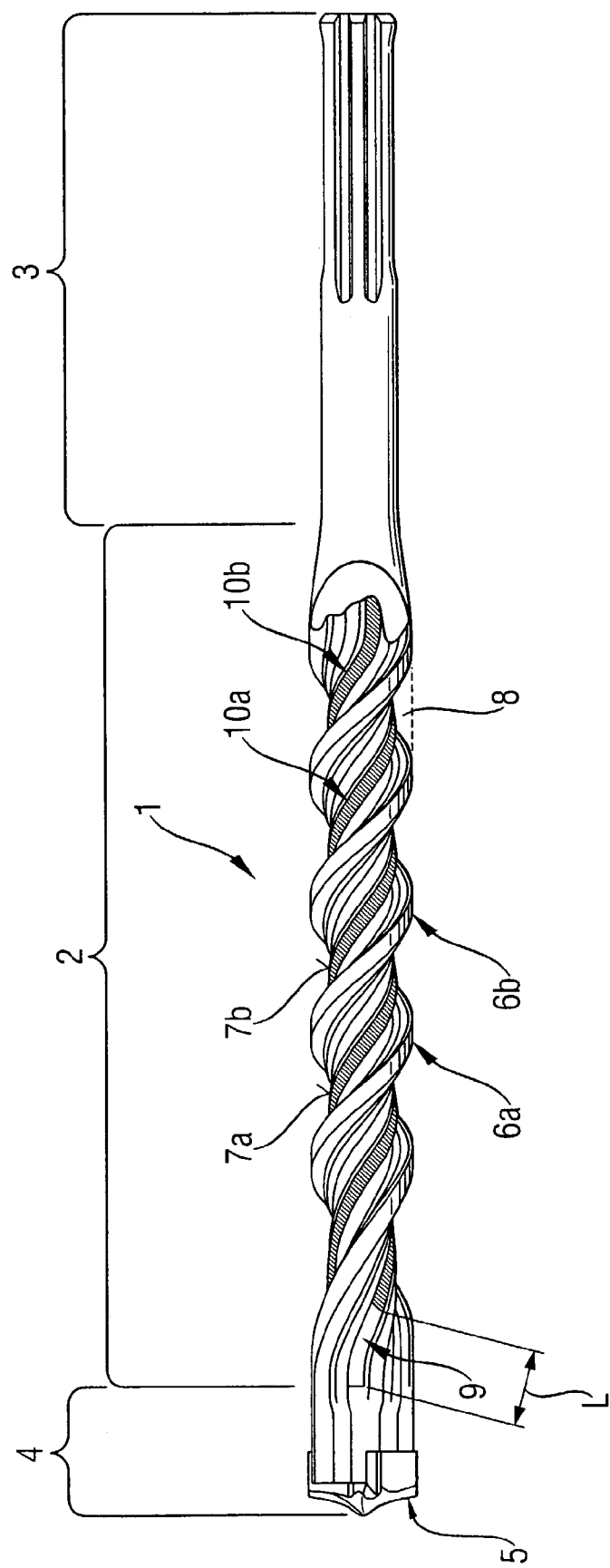

According to FIG. 1, an at least partially rotationally and percusively driven rock drill 1 comprises an elongated, helical shaft 2, comprising, at one end, an insertion end 3, and, at the opposite end, a tool head 4 with cutters 5 made of hard material, wherein a lengthwise colored layer 7a, 7b is arranged inside the helix groove 8 running along a double main helical spine 6a, 6b, whose worn length L is used as a wear indicator 9.

A radially smaller auxiliary helix 10a, 10b arranged between the double main helix spines 6a, 6b is radially externally coated with differently wear-resistant and differently colored layers 7a, 7b.

What is claimed is:

1. A rock drill for cutting rock comprising an elongated helical shaft (2) having, at one end, an insertion part (2) and, at an opposite end, a tool head (4) with cutters (5) made of hard material, wherein the helical shaft (2) is at least partially coated with a colored layer (7a, 7b) and wherein the colored layer (7a, 7b) forms a wear indicator marking (9) running along its length inside the helical groove (8); wherein a radially smaller auxiliary helix spine (10a, 10b) is coated with the colored layer (7a, 7b) relative to a helix (6).

2. The rock drill of claim 1, wherein several different auxiliary helix spines (10a, 10b) are coated with different colored, different wearing and colored coatings (7a, 7b).

3. The rock drill of claim 1, wherein the lengthwise running wear indicator marking (9) is a strip.

* * * * *